(12) United States Patent
Ikeda

(10) Patent No.: US 7,743,913 B2
(45) Date of Patent: Jun. 29, 2010

(54) ELECTRONIC COMPONENT CONVEYING APPARATUS AND METHOD OF CONTROLLING THE SAME

(75) Inventor: Mitsuru Ikeda, Echizen (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 12/127,939

(22) Filed: May 28, 2008

(65) Prior Publication Data

US 2008/0217136 A1  Sep. 11, 2008

Related U.S. Application Data

(63) Continuation of application No. PCT/JP2006/319959, filed on Oct. 5, 2006.

(30) Foreign Application Priority Data

Dec. 1, 2005  (JP) .............................. 2005-347910

(51) Int. Cl.
  B65H 5/08   (2006.01)
  B65H 5/18   (2006.01)
(52) U.S. Cl. ..................... 198/689.1; 198/380; 198/529; 198/471.1
(58) Field of Classification Search .............. 198/689.1, 198/529
  See application file for complete search history.

(56) References Cited

U.S. PATENT DOCUMENTS 3,771,647 A * 11/1973 Cumpston, Jr. .............. 209/3.1
5,373,933 A * 12/1994 Planke et al. ............. 198/689.1
5,842,579 A    12/1998 Garcia et al.
6,227,541 B1 *  5/2001 Couillard et al. ............ 271/307
7,017,731 B2    3/2006 Ikeda et al.

FOREIGN PATENT DOCUMENTS

JP  2002-128264 A  5/2002

OTHER PUBLICATIONS

Official communication issued in the International Application No. PCT/JP2006/319959, mailed on Oct. 31, 2006.
Official communication issued in counterpart Japanese Application No. 2005-347910, mailed on Oct. 31, 2006.

* cited by examiner

Primary Examiner—Gene Crawford
Assistant Examiner—Kavel P Singh
(74) Attorney, Agent, or Firm—Keating & Bennett, LLP

(57) ABSTRACT

When the operation of an electronic component conveying apparatus is to be stopped, application of a negative pressure to through holes is stopped, and a compressed air blowing mechanism blows compressed air from an exhaust nozzle with a pressure greater than a pressure applied during the operation of the electronic component conveying apparatus. Accordingly, an air curtain is generated at opening portions of the through holes on the guide member side, and the air curtain prevents electronic components from entering the through holes. The electronic components remaining in the through holes located downstream of the position of the exhaust nozzle in a conveying direction are conveyed to a measurement section so as to enable measurement of the characteristics thereof, and then discharged by a discharging mechanism in a discharge section. Thereafter, rotation of a conveying member is stopped.

6 Claims, 3 Drawing Sheets

ELECTRONIC COMPONENT CONVEYING APPARATUS AND METHOD OF CONTROLLING THE SAME

BACKGROUND OF THE INVENTION

1. Field of the Invention

The present invention relates to electronic component conveying apparatuses, and more particularly, to an electronic component conveying apparatus for conveying electronic components, such as capacitors, measuring the characteristics thereof, and sorting the electronic components into acceptable products and defective products and a method of controlling the same.

2. Description of the Related Art

A known configuration of an electronic component conveying apparatus is disclosed in Japanese Translation of International Patent Application Publication No. 2000-501174. The electronic component conveying apparatus includes a plate-shaped conveying member having a plurality of through holes, a guide member arranged to guide electronic components to the through holes, a driving mechanism arranged to rotate the conveying member, a suction mechanism arranged to apply a negative pressure to the through holes and suck the electronic components into the through holes, a measuring terminal provided near the conveying member, a discharging mechanism provided near the conveying member, and a compressed air blowing mechanism provided near an outlet of the guide member and having an exhaust nozzle arranged to blow compressed air to an upper surface of the conveying member. The electronic components may become adhered to the surface of the conveying member with electrostatic action. The compressed air blowing mechanism is used to release the electronic components from the conveying member.

It is desirable that the conveying member is stopped after all electronic components have been discharged from the through holes of the conveying member when the operation of the electronic component conveying apparatus is to be stopped. However, electronic components remain in the through holes of the conveying member because the electronic components have already been sucked into the through holes when the operation of the electronic component conveying apparatus is to be stopped. A remaining electronic component becomes an obstacle when the measuring terminal is cleaned for maintenance, an electronic component located below the measuring terminal becomes scratched, or the capacitance value of a capacitor varies due to a piezoelectric effect. Also, if the electronic components are left as they are for an extended period of time, the characteristics thereof may be modified, and consequently, the electronic components may become defective products.

SUMMARY OF THE INVENTION

To overcome the problems described above, preferred embodiments of the present invention provide an electronic component conveying apparatus capable of discharging all electronic components from through holes of a conveying member and preventing production of defective products when an operation is to be stopped and a method of controlling the same.

An electronic component conveying apparatus according to a preferred embodiment of the present invention includes a conveyance table having a conveyance surface, a plate-shaped conveying member mounted on the conveyance table and having a plurality of through holes, a guide member arranged to guide electronic components to the through holes, a driving mechanism arranged to move the conveying member, a suction mechanism arranged to apply a negative pressure to the through holes, a measuring portion provided near the conveying member, a discharging mechanism provided near the conveying member, and a compressed air blowing mechanism provided near an outlet of the guide member and having an exhaust nozzle arranged blow compressed air to an upper surface of the conveying member.

In this apparatus, when the conveying member is to be stopped, an operation of the suction mechanism is stopped, the compressed air is blown from the exhaust nozzle of the compressed air blowing mechanism so as to prevent the electronic components from entering the through holes, the electronic components remaining in the through holes located downstream of a location of the exhaust nozzle in a conveying direction are conveyed to the measuring portion and then to the discharging mechanism so as to be discharged, and then the conveying member is stopped.

In addition, a method of controlling an electronic component conveying apparatus according to another preferred embodiment of the present invention is provided.

The electronic component conveying apparatus includes a conveyance table having a conveyance surface, a plate-shaped conveying member mounted on the conveyance table and having a plurality of through holes, a guide member arranged to guide electronic components to the through holes, a driving mechanism arranged to move the conveying member, a suction mechanism arranged to apply a negative pressure to the through holes, a measuring portion provided near the conveying member, a discharging mechanism provided near the conveying member, and a compressed air blowing mechanism provided near an outlet of the guide member and having an exhaust nozzle arranged to blow compressed air to an upper surface of the conveying member.

The method includes, when the conveying member is to be stopped, stopping an operation of the suction mechanism, blowing the compressed air from the exhaust nozzle of the compressed air blowing mechanism so as to prevent the electronic components from entering the through holes, conveying the electronic components remaining in the through holes located downstream of a location of the exhaust nozzle in a conveying direction to the measuring portion and then to the discharging mechanism so as to be discharged, and then stopping the conveying member.

In preferred embodiments of the present invention, when the operation of the electronic component conveying apparatus is stopped, the operation of the suction mechanism is stopped, and the compressed air blowing mechanism blows the compressed air from the exhaust nozzle with a pressure greater than a pressure applied during the operation of the electronic component conveying apparatus (at least a pressure that prevents the electronic components from entering the through holes). Accordingly, an air curtain is generated at opening portions of the through holes. The air curtain prevents the electronic components from entering the through holes. Alternatively, the compressed air causes a suction effect (a negative pressure), resulting in the electronic components accommodated in the through holes being pulled out from the through holes. Thus, the electronic components are stopped from entering the through holes. The electronic components remaining in the through holes located downstream of a location of the exhaust nozzle in a conveying direction are conveyed to the measuring portion and then to the discharging mechanism so as to be discharged, and then the conveying member is stopped after all electronic components accommodated in the through holes have been discharged. The remaining electronic components may be measured by the measuring portion.

In the electronic component conveying apparatus according to preferred embodiments of the present invention, the conveyance surface of the conveyance table preferably may be inclined upwardly at an angle from about 40° to about 90°, for example. The conveying member may have a disk shape, and may be rotated by the driving mechanism. Also, imagining that the conveying member preferably is a clock face, the guide member may preferably supply the electronic components to the through holes of the conveying member in an area from approximately a five o'clock position to approximately a ten o'clock position of the clock face, for example. Further, the guide member may preferably be located at a location to receive the electronic components released from the conveying member by the compressed air blowing mechanism.

With preferred embodiments of the present invention, since the conveying member is stopped after all electronic components have been discharged from the through holes of the conveying member, the electronic components may be prevented from becoming scratched by measuring terminals, and the characteristics of the electronic components may be prevented from being modified as a result of the electronic components being left in the through holes for an extended period of time. As a result, the production of defective products may be reduced.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of an electronic component conveying apparatus and a method of controlling the same according to the present invention are described below with reference to the attached drawings.

First Preferred Embodiment

Figure 1:
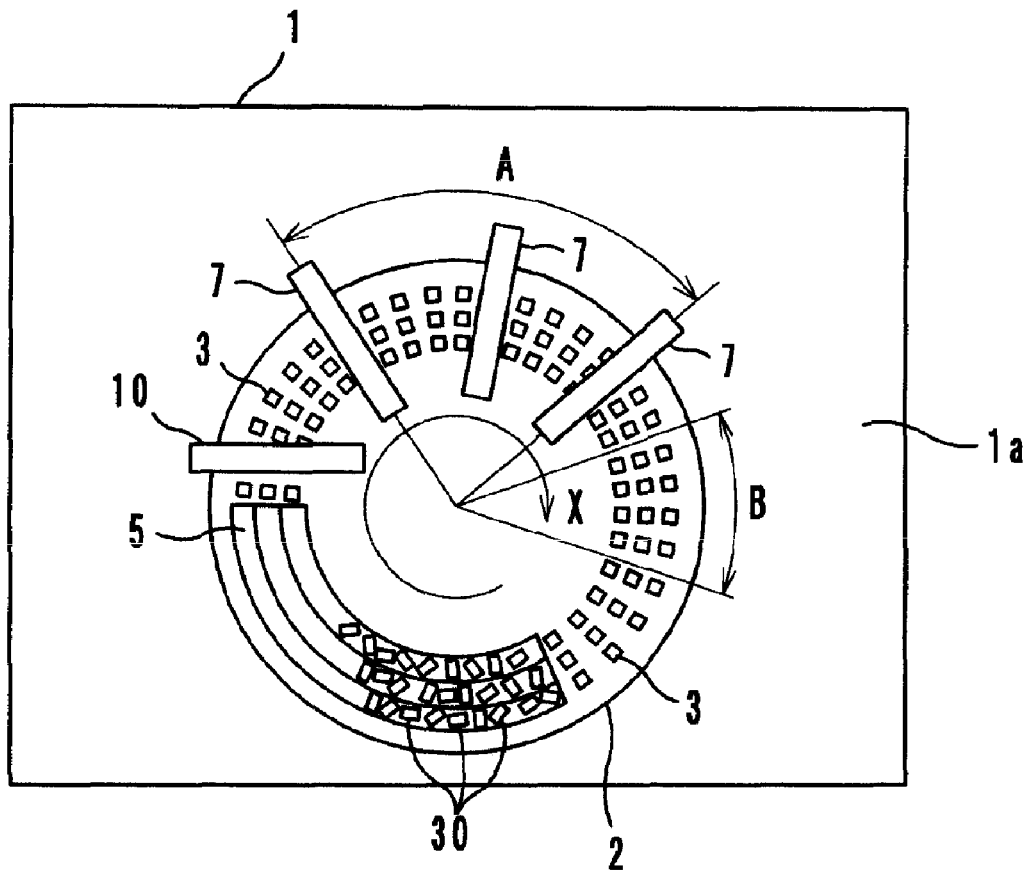
FIG. 1 is a schematic illustration showing the structure of a preferred embodiment of an electronic component conveying apparatus.
Figure 2:
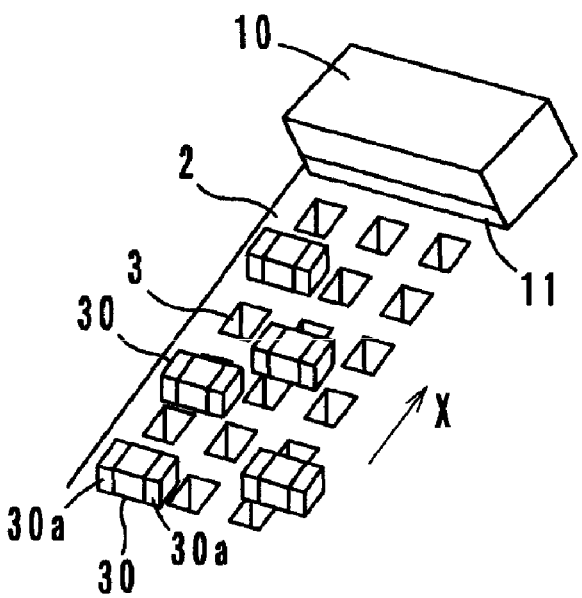
FIG. 2 is an enlarged perspective view showing a portion near a compressed air blowing mechanism shown in FIG. 1.

As shown in FIGS. 1 and 2, an electronic component conveying apparatus of a first preferred embodiment includes a conveyance table 1 having a conveyance surface 1a, a disk-shaped conveying member 2 mounted on the conveyance table 1 and having a plurality of through holes 3, a guide member 5 arranged to guide electronic components 30 to the through holes 3, a driving mechanism (not shown) arranged to rotate the conveying member 2, a suction mechanism (not shown) arranged to apply a negative pressure to the through holes 3, a plurality of measuring terminal portions 7 provided near the conveying member 2, a discharging mechanism (not shown) provided near the conveying member 2, and a compressed air blowing mechanism 10 provided near an outlet of the guide member 5 and having an exhaust nozzle 11 that blows compressed air to an upper surface of the conveying member 2.

In the first preferred embodiment, the conveyance surface 1a of the conveyance table 1 preferably is substantially perpendicular (about 90°) to the guide member 5. Alternatively, it may be inclined upwardly at an angle ranging from about 40° to about 90°, for example. The conveying member 2 includes the plurality of through holes 3. The through holes 3 may longitudinally accommodate the electronic components 30 (see FIG. 3) such that outer electrodes 30a provided at both ends of each electronic component 30 are disposed at front and back sides of the conveying member 2. The electronic components 30 are sucked into the through holes 3 by vacuum suction using the suction mechanism from the bottoms of the through holes 3 (the right side in FIG. 3). The conveying member 2 successively conveys the electronic components 30 accommodated in the through holes 3 by intermittent rotation of the conveying member 2 in a direction indicated by an arrow X.

The guide member 5 is a known mechanism having a tunnel structure. Imagining that the conveying member 2 preferably is a clock face, the guide member 5 extends in an area between approximately a five o'clock position and approximately a nine o'clock position of the clock face, for example. The area in which the guide member 5 is provided may be within an area between approximately the five o'clock position and approximately a ten o'clock position, for example. The electronic components 30 temporarily stored in an area corresponding to a six o'clock position of the guide member 5, and are inserted into the through holes 3. The discharging mechanism has a compressed air exhaust port at the conveyance surface 1a of the conveyance table 1.

The suction mechanism, the driving mechanism, and the discharging mechanism have the same mechanisms provided in the known electronic component conveying apparatus. Thus, the description of the mechanisms is omitted.

Next, a method of controlling the electronic component conveying apparatus having the above-described configuration is described. While the electronic component conveying apparatus is operated, the through holes 3 are in the negative pressure state, and the conveying member 2 is rotated by the driving mechanism in the direction indicated by the arrow X. The electronic components 30 are conveyed to opening portions of the through holes 3 by the guide member 5, and sucked into the through holes 3 due to the negative pressure. The through holes 3 that accommodate the electronic components 30 are intermittently moved to the compressed air blowing mechanism 10 and then to a measurement section A.

Figure 3:
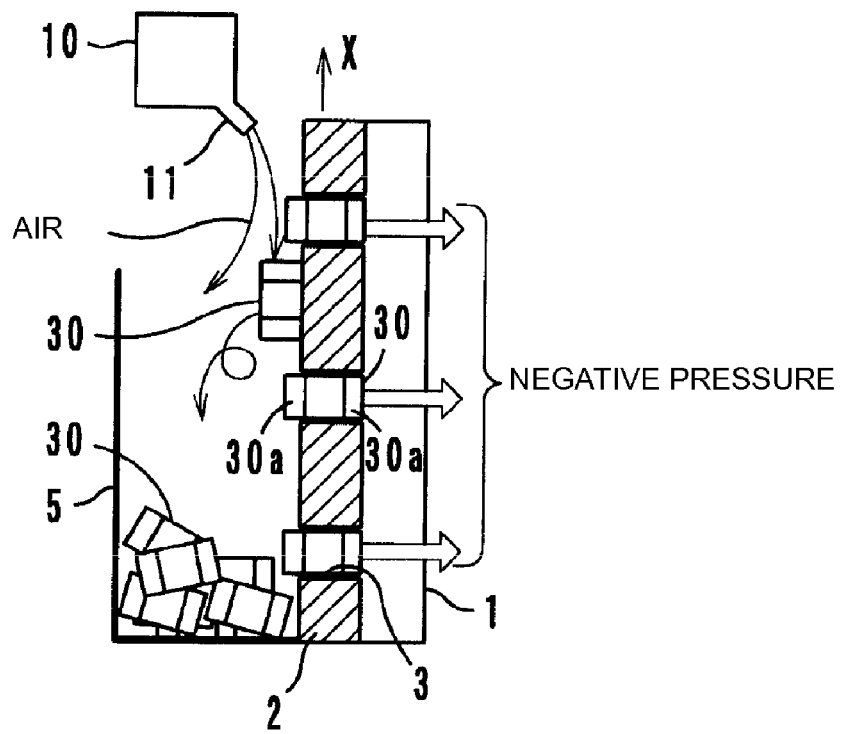
FIG. 3 is a cross-sectional view schematically showing a method of controlling the electronic component conveying apparatus according to a preferred embodiment of the present invention.

At this time, the electronic components 30 may become adhered to the surface of the conveying member 2 by electrostatic action. As shown in FIG. 3, the compressed air blowing mechanism 10 blows air from the exhaust nozzle 11 so as to release the adhered electronic components 30 from the conveying member 2. An upper portion of the guide member 5 near the exhaust nozzle 11 of the compressed air blowing mechanism 10 is open. Due to this, the electronic components 30 released from the conveying member 2 are returned to the guide member 5. If the pressure of the air blown from the exhaust nozzle 11 is too low, the releasing effect is insufficient. If the pressure is too high, the electronic components 30 are agitated on the guide member 5, and collide with each other. This may cause the electronic components 30 to be cracked, or to be moved outside the guide member 5. Thus, the air pressure is set to an appropriate pressure.

When the electronic components 30 are conveyed to the measurement section A, the electrical characteristics of the electronic components 30 are measured at predetermined locations by contact terminals (not shown) of the measuring terminal portions 7. Then, the electronic components 30 are conveyed to a discharge section B so as to be sorted into acceptable products and defective products, and discharged by the discharging mechanism.

Figure 4:
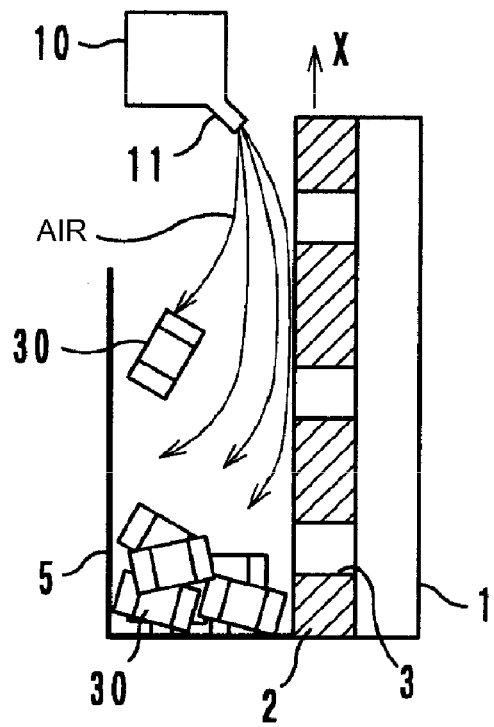
FIG. 4 is a cross-sectional view schematically showing the method of controlling the electronic component conveying apparatus continued from FIG. 3.

When the operation of the electronic component conveying apparatus is to be stopped, the application of the negative pressure to the through holes 3 is stopped. As shown in FIG. 4, the compressed air blowing mechanism 10 blows the compressed air from the exhaust nozzle 11 with a pressure greater than the pressure applied during the operation of the electronic component conveying apparatus. Accordingly, an air curtain is generated at the opening portions of the through holes 3. The air curtain prevents the electronic components 30 from entering the through holes 3. In addition, the compressed air causes a suction effect (a negative pressure), resulting in the electronic components 30 accommodated in the through holes 3 being pulled out from the through holes 3. When the operation is to be stopped, the pressure of the compressed air blown from the exhaust nozzle 11 may be at least a pressure that prevents the electronic components 30 from entering the through holes 3.

Alternatively, the pressure of the compressed air may be a pressure causing the electronic components 30 accommodated in the through holes 3 to be removed. In such a case, since the electronic components 30 accommodated in the through holes 3 are removed, the moving distance of the conveying member 2 (described below) may be small, and thus, the time required to stop the operation may be short.

The electronic components 30 remaining in the through holes 3 located downstream of a location of the exhaust nozzle 11 of the compressed air blowing mechanism 10 in the conveying direction X are conveyed to the measurement section A so as to enable measurement of the characteristics thereof, and then discharged by the discharging mechanism in the discharge section B. After all electronic components 30 accommodated in the through holes 3 have been discharged, the rotation of the conveying member 2 is stopped. The remaining electronic components 30 may pass through the measurement section A without having their characteristics measured, and may be discharged at the discharge section B.

As described above, since the conveying member 2 is stopped after all electronic components 30 have been discharged from the through holes 3 of the conveying member 2, the electronic components 30 may be prevented from becoming scratched by terminals of the measuring terminal portions 7, and the characteristics of the electronic components 30 may be prevented from being modified as a result of the electronic components 30 being left in the through holes 3 for an extended period of time. As a result, the production of defective products may be reduced and prevented.

Second Preferred Embodiment

Figure 5:
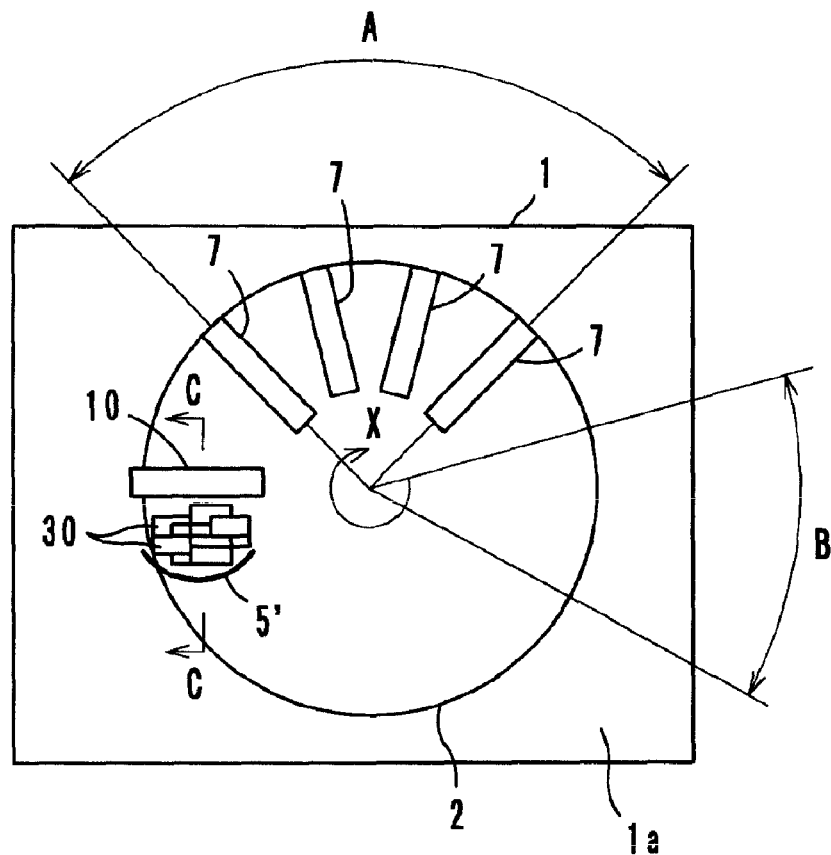
FIG. 5 is a schematic illustration showing the structure of a second preferred embodiment of an electronic component conveying apparatus.
Figure 6:
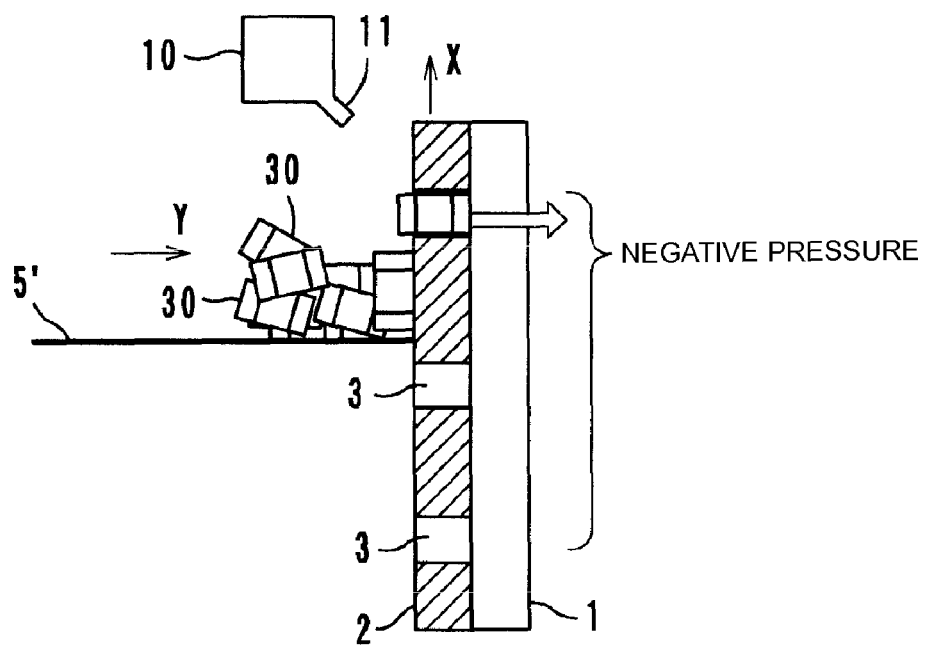
FIG. 6 is a cross-sectional view taken along a line indicated by arrows C-C in FIG. 5.

Next, an electronic component conveying apparatus according to a second preferred embodiment of the present invention is described with reference to FIGS. 5 and 6. The conveying apparatus includes a guide member 5' provided directly below the compressed air blowing mechanism 10 and extending horizontally in a direction substantially perpendicular to the conveying member 2. The guide member 5' moves the electronic components 30 in a direction indicated by an arrow Y with vibration action or other suitable action, so that the electronic components 30 are inserted into the through holes 3.

The second preferred embodiment is similar to the first preferred embodiment except for the configuration of the guide member 5'. In FIGS. 5 and 6, the same reference numerals are used for similar members and portions, corresponding to those shown in FIGS. 1 to 4, and descriptions thereof are omitted. Also, the through holes of the conveying member 2 are not shown in FIG. 5.

The electronic component conveying apparatus and the method of controlling the same according to the present invention are not limited to those described in the above-described preferred embodiments, and may be modified to various configurations within the scope of the present invention.

Accordingly, the present invention provides an electronic component conveying apparatus for conveying electronic components, such as capacitors, measuring the characteristics thereof, and sorting the electronic components into acceptable products and defective products and a method of controlling the same. In particular, the present invention suppresses the production of defective products.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electronic component measuring apparatus comprising:
    a conveyance table having a conveyance surface being inclined upwardly at an angle ranging from about 40° to about 90°;
    a disc-shaped conveying member mounted on the conveyance table and having a plurality of through holes;
    a guide member arranged to guide a plurality of electronic components that are randomly arranged to the plurality of through holes;
    a driving mechanism arranged to move the conveying member;
    a suction mechanism arranged to apply a negative pressure to the plurality of through holes;
    a measuring portion provided adjacent to the conveying member;
    a discharging mechanism provided adjacent to the conveying member; and
    a compressed air blowing mechanism having an exhaust nozzle provided adjacent to an outlet of the guide member and arranged to blow compressed air to an upper surface of the conveying member; wherein
    the plurality of electronic components are fed to the conveying member and disposed in the plurality of through holes in the conveying member by the negative pressure applied by the suction mechanism;
    the plurality of electronic components are conveyed by the conveying member while the plurality of electronic components are disposed in the plurality of through holes;
    electrical characteristics of the plurality of the electronic components are measured by the measuring portion during the conveyance of the plurality of electronic components that are disposed in the plurality of through holes;

each of the plurality of through holes has an opening in the upper surface of the conveying member;

the guide member is arranged along the movement path of the plurality of through holes;

the compressed air blowing mechanism is arranged to blow compressed air in a direction such that the compressed air flows along the upper surface of the conveying member and generates a suction effect resulting in the electronic components disposed in the plurality of through holes being pulled out from the plurality of through holes; and when the conveying member is to be stopped in such a state that the plurality of electronic components that are waiting in a random position are located on the guide member, an operation of the suction mechanism is stopped, the compressed air is blown from the exhaust nozzle of the compressed air blowing mechanism so as to prevent the plurality of electronic components from entering the plurality of through holes, the plurality of electronic components remaining in the plurality of through holes located downstream of a location of the exhaust nozzle in a conveying direction are conveyed to the measuring portion and then to the discharging mechanism so as to be discharged, and then the conveying member is stopped.

2. The electronic component measuring apparatus according to claim 1, the guide member is arranged to supply the plurality of electronic components to the plurality of through holes of the conveying member in an area from approximately a five o'clock position to approximately a ten o'clock position of the conveying member.

3. The electronic component measuring apparatus according to claim 1, wherein the guide member is located at a position to receive the plurality of electronic components released from the conveying member by the compressed air blowing mechanism.

4. The electronic component measuring apparatus according to claims 1, wherein when the conveying member is to be stopped, the exhaust nozzle of the compressed air blowing mechanism blows the compressed air with a pressure causing the plurality of electronic components disposed in the plurality of through holes to be removed.

5. A method of controlling an electronic component measuring apparatus including a conveyance table having a conveyance surface that is inclined upwardly at an angle ranging from about 40° to about 90°, a disc-shaped conveying member mounted on the conveyance table and having a plurality of through holes, a guide member arranged to guide a plurality of electronic components that are randomly arranged to the plurality of through holes, a driving mechanism arranged to move the conveying member, a suction mechanism arranged to apply a negative pressure to the plurality of through holes, a measuring portion provided adjacent to the conveying member, a discharging mechanism provided adjacent to the conveying member, and a compressed air blowing mechanism having an exhaust nozzle provided adjacent an outlet of the guide member and arranged to blow compressed air to an upper surface of the conveying member, wherein the plurality of electronic components are fed to the conveying member and accommodated in the plurality of through holes in the conveying member by the negative pressure applied by the suction mechanism, the plurality of electronic components are conveyed by the conveying member while the plurality of electronic components are accommodated in the plurality of through holes, electrical characteristics of the plurality of the electronic components are measured by the measuring portion during the conveyance of the plurality of electronic components that are accommodated in the plurality of through holes, each of the plurality of through holes has an opening in the upper surface of the conveying member, the guide member is arranged along the movement path of the plurality of through holes, the compressed air blowing mechanism blowing compressed air in a direction in which the compressed air flows along the upper surface of the conveying member, the method comprising the steps of:

when the conveying member is to be stopped in such a state that the plurality of electronic components that is waiting in a random position is located on the guide member, stopping an operation of the suction mechanism;

blowing the compressed air from the exhaust nozzle of the compressed air blowing mechanism so as to prevent the plurality of electronic components from entering the plurality of through holes;

conveying the plurality of electronic components remaining in the plurality of through holes located downstream of a location of the exhaust nozzle in a conveying direction to the measuring portion and then to the discharging mechanism so as to be discharged; and then stopping the conveying member.

6. The method of controlling the electronic component measuring apparatus according to claim 5, wherein when the conveying member is to be stopped, the exhaust nozzle of the compressed air blowing mechanism blows the compressed air with a pressure causing the plurality of electronic components accommodated in the plurality of through holes to be removed.

* * * * *